US006177365B1

(12) United States Patent
Li

(10) Patent No.: US 6,177,365 B1
(45) Date of Patent: Jan. 23, 2001

(54) TWO-LAYERED COATING SYSTEM FOR AIRBAG FABRICS

(75) Inventor: Shulong Li, Spartanburg, SC (US)

(73) Assignee: Milliken & Company, Spartanburg, SC (US)

( * ) Notice: Under 35 U.S.C. 154(b), the term of this patent shall be extended for 0 days.

(21) Appl. No.: 09/335,257

(22) Filed: Jun. 17, 1999

(51) Int. Cl.$^7$ .......................... B32B 27/04; B32B 27/12; B60R 21/16
(52) U.S. Cl. ..................... 442/71; 280/728.1; 493/243; 425/27; 425/35; 425/43; 428/35.7; 428/36.1; 428/36.6; 428/36.7; 442/81; 442/82; 442/157; 442/167; 442/168; 442/169; 442/170; 442/171; 442/172; 442/173
(58) Field of Search .................. 280/728.1; 493/243; 425/27, 35, 43; 428/35.7, 36.1, 36.6, 36.7; 442/71, 81, 82, 157, 167, 168, 169, 170, 171, 173, 172

(56) References Cited

U.S. PATENT DOCUMENTS

| 3,705,645 | | 12/1972 | Konen .................................... 206/46 |
|---|---|---|---|
| 4,217,256 | | 8/1980 | Peerman et al. ........................ 260/18 |
| 4,489,127 | * | 12/1984 | Gutek et al. ........................... 428/266 |
| 4,921,735 | | 5/1990 | Bloch .................................... 428/34.9 |
| 4,994,225 | | 2/1991 | Davis .................................... 264/257 |
| 5,073,418 | | 12/1991 | Thornton et al. ..................... 428/34.9 |
| 5,110,666 | | 5/1992 | Menzel et al. ........................ 428/196 |
| 5,193,847 | * | 3/1993 | Nakayama ............................ 280/738 |
| 5,208,097 | | 5/1993 | Honma et al. ........................ 428/226 |
| 5,254,621 | * | 10/1993 | Inoue et al. ........................... 524/837 |
| 5,258,211 | * | 11/1993 | Momii et al. ......................... 428/35.2 |
| 5,399,402 | | 3/1995 | Inoue et al. ........................... 428/35.7 |
| 5,421,378 | | 6/1995 | Bowers et al. ...................... 139/435.1 |
| 5,503,197 | | 4/1996 | Bowers et al. ...................... 139/435.1 |
| 5,524,926 | * | 6/1996 | Hirai et al. .......................... 280/743.1 |
| 5,529,837 | | 6/1996 | Fujiki et al. ........................... 428/266 |
| 5,944,345 | * | 8/1999 | Hirai et al. .......................... 280/743.1 |
| 5,945,185 | * | 8/1999 | Hirai et al. ............................ 428/35.2 |
| 5,989,660 | * | 11/1999 | Moriwaki et al. ................... 428/35.2 |
| 6,037,279 | * | 3/2000 | Brookman et al. ...................... 442/71 |
| 6,073,961 | * | 6/2000 | Bailey et al. ....................... 280/730.2 |

FOREIGN PATENT DOCUMENTS

WO 99/62746 * 12/1999 (WO) ............................ B60R/21/16

* cited by examiner

*Primary Examiner*—Terrel Morris
*Assistant Examiner*—Arti Singh
(74) *Attorney, Agent, or Firm*—Terry T. Moyer; William S. Parks

(57) ABSTRACT

This invention relates to novel airbag coating compositions comprising at least two separate and distinct layers. The first layer (base coat), being in contact with the airbag surface, comprises a non-silicone composition of at least one coating material, provides excellent adhesion, excellent tensile strength, and lower cost than standard silicone materials. The second layer, being a coating for the first layer, provides excellent reinforcement and aging characteristics to prevent degradation of the first layer. Such a second layer (topcoat) is preferably a silicone material. This two-layer system permits excellent strength and aging properties to prevent seam combing at relatively low cost due to the inexpensive basecoat materials and the relatively low amount required for the topcoat. An airbag fabric coated with this inventive two-layer system is also contemplated within this invention.

19 Claims, No Drawings

TWO-LAYERED COATING SYSTEM FOR AIRBAG FABRICS

FIELD OF THE INVENTION

This invention relates to novel airbag coating compositions comprising two separate and distinct layers. The first layer (base coat), being in contact with the airbag surface, comprises a non-silicone composition of at least one coating material, provides excellent adhesion, excellent tensile strength, and lower cost than standard silicone materials. The second layer, being a coating for the first layer, provides reinforcement and excellent aging characteristics to prevent degradation of the first layer. Such a second layer (topcoat) is preferably a silicone material. This two-layer system permits excellent strength and aging properties to prevent seam combing at relatively low cost due to the inexpensive basecoat materials and the relatively low amount required for the topcoat. An airbag fabric coated with this inventive two-layer system is also contemplated within this invention.

BACKGROUND OF THE INVENTION

Airbags for motor vehicles are known and have been used for a substantial period of time. These devices are installed on the driver and passenger side of automobiles and, in the event of a collision, are rapidly inflated with gas, to act as an energy absorbing barrier between the driver or passenger and the steering wheel or dashboard of the automobile.

With the advent of new curtain-type airbags comprising a plurality of pillows formed from stitched areas of the bag article (to protect passengers during roll-over and side impact collision events), there is now a greater emphasis on providing such curtain-type airbags which will retain their inflation pressure for extended period after deployment, and will perform if and when necessary even upon storage of a long duration (years for example). Such pillowed fabrics thus comprise seams which control the shape and size of the inflated cushion. Upon inflation of such specific airbag cushions, pressure may be applied in great force, particularly on the seams, during an inflation in response to a collision event. These stitched areas thus must retain their strength upon inflation, thereby setting forth the requirement that the individual yarns at such seams will not become unraveled (i.e., "combed-out") easily (which would result in the leakage air at too great a rate to afford sufficient protection), particularly upon inflation of the airbag. With such an expansion in stitching requirements as compared with traditional driver-side and passenger-side airbags, the areas for potential air leakage have also increased dramatically.

In the past, coatings have been applied to fabrics, intended for use in automotive airbags, to resist the unwanted permeation of air through the fabric and, to a lesser extent, to protect the fabric from detriment by the hot gases used to inflate the bags. Polychloroprene was the polymer of choice in the early development of this product, but the desire to decrease the folded size of the completed airbag, and the tendency of polychloroprene to degrade, with exposure to heat, to release the components of hydrochloric acid (thereby potentially degrading the fabric component as well as releasing hazardous chemicals), has led to the almost universal acceptance of silicone (polydimethylsiloxane or similar materials) as a more suitable coating. In the quest for the most compact folded size possible, coating levels of polymer have dropped from around 2.5 ounces per square yard of fabric, to levels approaching 0.5 ounces per square yard.

New developments in airbag technology, particularly newer designs being placed in the sides of the passenger compartment (as noted above), have introduced the requirement that the bags hold pressure longer under use. This, and the evolution of the lower coating levels of silicone polymer, have begun to highlight the effect that, when a sewn seam is put under stress, a naturally lubricating silicone coating may allow the yarns from which the fabric is constructed to shift. This shifting can lead to leakage of the inflating gas through the new pores formed from the shifting yarns, or, in drastic cases, cause the seam to fail. Since the airbag must retain its integrity during a collision event, in order to sufficiently protect the driver or passenger, there is a great need to provide coatings which provide both effective permeability characteristics and sufficient restriction of yarn shifting for the airbag to function properly, if and when necessary. In recent years, silicone coatings have been utilized to provide such desired permeability and strength characteristics. However, the relative cost of such coating materials (such as polydimethylsiloxane) is sufficiently high that new, more inexpensive alternatives are being sought. Thus, there exists a need for providing good adhesion and a strong bond between the individual yarns (in order to effectuate long-term rigidity of the fibers to prevent unraveling) at cut edges or at seams while simultaneously providing aging stability and excellent low air permeability characteristics. Such a necessary improvement has not been afforded the airbag industry within the prior art. However, the inventive two-layer coating system does provide the necessary strength, durability, permeability, and reliability to the airbag industry, particularly for large-scale production of heavily stitched curtain-type airbags.

DESCRIPTION OF THE INVENTION

Although silicones and neoprene have been the predominant coatings utilized in the airbag industry traditionally, as noted above, it has been determined that these coatings exhibit certain shortcomings which actually make them undesirable as the sole coatings present on target fabrics. For example, silicones are very expensive and act as natural fiber lubricants rather than adhesives. Silicone elastomers are very flexible which permits facilitation of folding of coated airbags for long-term storage in airbag modules. However, compared with other elastomers, silicones possess poor tensile strength and poor tear resistance. As such, these compounds do not provide the best overall strength to prevent unraveling of seam yarns, and certainly are not cost-effective selections for this purpose. Neoprene degrades very easily and thus does not exhibit sufficient aging stability. Furthermore, thicker coatings of such rubber compounds are required to reduce the air permeability to an acceptable level which can result in higher costs, although neoprene is not as expensive as the aforementioned silicones. Lastly, neither of these two traditional coating materials permits a single application over the entire airbag fabric in order to provide both air permeability characteristics over the non-stitched (and thus plain fabric) portion with effective adhesion for the individual fibers within the seamed areas.

Thus, an object of the invention has been to provide excellent strength and adhesion to the seam yarns (or yarns at cut edges of the target fabric) while simultaneously allowing for durability (aging stability) as well as desirable low air permeability over the plain fabric of the target airbag fabric, all at a relatively low cost. Another object of the invention has been to provide a coating system or composition which is easy to apply to target airbag fabrics as well.

Accordingly, this invention provides a coating system (i.e., composition) for airbag fabrics comprising at least two layers wherein the first layer is in contact with at least a portion of the airbag fabric and is at least one non-silicone coating material and the second layer is a coating for at least a portion of said first layer and is at least one material providing sufficient aging stability for the first layer material selected from the group consisting of at least one non-silicone compound and at least one silicone compound. In particular, the first layer material must possess certain properties critical to properly seal a woven seam at high pressure. Thus, this layer must be comprised of a non-silicone material exhibiting a tensile strength of greater than 600 psi, preferably greater than 800 psi, and most preferably greater than 1,000 psi, with an elongation at break of between about 100 and 600% of its original length. The first layer thus may be comprised of one or more of polyurethanes, polyacrylates, polyamides, butyl rubbers, hydrogenated nitrile rubbers, ethylene-vinyl acetate copolymers, and the like. Potentially preferred are polyamides, polyurethanes, polyacrylates, and mixtures thereof. Furthermore, these first layer materials also are generally available at lower cost than the standard silicone resins and rubbers which possess the desired tensile strength and elongation characteristics noted above. The add-on weight of this first layer over the target fabric is from about 0.3 to about 1.5 ounces per square yard, preferably this add-on weight is from about 0.5 to about 1.2, more preferably from about 0.6 to about 0.9. Additionally, it has been found that the first layer materials may preferably be present in water dispersions or emulsions in order to provide better seam combing resistance to the resultant treated airbag fabric. Such dispersions or emulsions are also easy to handle and apply to the target fabric surface and can be utilized at differing temperatures without loss of performance. This first layer surprisingly works synergistically with the second layer to provide the desired properties.

The second layer must possess, at the very least, good aging stability to protect the first layer from degradation upon long duration storage within an airbag module. Furthermore, said second layer may also preferably provide reinforcement for the first layer. Silicones (such as polydimethylsiloxane and those resins and rubbers which are to be avoided within the first layer) provide particularly good performance regarding this requirement. Since the add-on weight of the second layer necessary to effectuate proper aging stability for the first layer (from about 0.3 to about 2.5 ounces per square yard as well, preferably from about 0.6 to about 1.5) is much lower than the standard add-on weight for such silicone compounds on curtain-type airbag fabrics, the costs associated with this two-layer system (when a silicone is used as the topcoat) is dramatically lower than for past coating compositions. Furthermore, the costs associated with the first layer non-silicone components are also much lower than for the silicone resins, rubbers, and the like, traditionally used in airbag coating applications. Thus, the overall costs of the inventive coating system is, again, much lower than for silicones used alone to provide any similar strength and air permeability characteristics to the plain fabric. Also, a non-silicone compound or polymer may be used as the topcoat (second layer) for this inventive coating system as long as that non-silicone provides an effective aging stability benefit for the first layer. Polyacrylates, ethylene-vinyl acetates, ethylene-methyl acrylates, and the like, particularly with added stabilizers present, provide such beneficial aging stability, which, again, would, upon utilization, reduce the overall costs of the inventive coating system by eliminating the need for expensive silicones. In such an event, the non-silicone second layer would be added in an amount of from about 0.3 to about 2.5 ounces per square yard, preferably, from about 0.6 to about 1.5.

With regard to the first layer, potentially preferred materials include a polyurethane, available from Stahl USA, Peabody Mass., under the tradename Ru 40-350 (40% solids); polyacrylates, (a) available from Rohm & Haas, under the tradename Rhoplex® E-358 (60% solids), (b) available from Shell Chemical Company, Houston, Tex., under the tradename Epi-Rez™ 5520 (60% solids), and (c) available from Para-chem Southern, Inc., Greenville, S.C., under the tradename Pyropoly AC 2000™; a polyamide dispersion marketed under the trade designation MICRO-MID™ 632 hpl by Union Camp Corporation which is believed to have a place of business in Wayne, N.J.; other polyurethane resins, Witcobond™ 253 (35% solids), from Witco, and Sancure, from BFGoodrich, Cleveland, Ohio; hydrogenated NBR, such as Chemisat™ LCD-7335X (40% solids), from Goodyear Chemical, Akron, Ohio; and butyl rubber, such as Butyl rubber latex BL-100, from Lord Corporation. As noted above, mixtures or combinations of non-silicone materials may also be utilized such as a dispersion of polyurethane and polyacrylate, as merely an example. Potentially preferred compositions are noted below including dispersions comprising polyurethane and polyacrylate. Preferably, in such an instance, the ratio of polyurethane to polyacrylate should be in an amount of from about 0.1:1 to about 10:1; preferably from about 1:1 to about 8:1; more preferably from about 2:1 to about 5:1; and most preferably from about 2:1 to about 2.5:1.

The substrate across which the cross-linked elastomeric resin coatings are applied to form the airbag base fabric in accordance with the present invention is preferably a plain woven fabric formed from yarns comprising polyamide or polyester fibers. Such yarn preferably has a linear density of about 100 denier to about 630 denier. Such yarns are preferably formed from multiple filaments wherein the filaments have linear densities of about 6 denier per filaments or less and most preferably about 4 denier per filament or less. Such substrate fabrics are preferably woven using jacquard looms or possibly through the utilization of fluid jet weaving machines as disclosed in U.S. Pat. Nos. 5,503,197 and 5,421,378 to Bower et al. (incorporated herein by reference). The fabric substrate with applied coating system will hereinafter be referred to as an airbag base fabric. Other possible components present within either of the two layers (or both) composition are thickeners, antioxidants, flame retardants, curing agents, coalescent agents, adhesion promoters, and colorants. Any well known thickener for polyurethanes and/or polyacrylates may be utilized in this invention. One potentially preferred thickener is marketed under the trade designation NATROSOL™ 250 HHXR by the Aqualon division of Hercules Corporation which is believed to have a place of business at Wilmington, Del. Also, in order to meet Federal Motor Vehicle Safety Standard 302 flame retardant requirements for the automotive industry, a flame retardant is also preferably added to the compounded mix. Any well known airbag flame retardant may be used (including aluminum trihydrate, as merely one example). One potentially preferred flame retardant is DE-83R, 70% Dispersion marketed by Great Lakes Chemical.

Once compounding is complete (and the preferably resultant dispersion possess a viscosity of about 8,000 centipoise), the first layer is preferably scrape-coated across the fabric substrate and dried and cured to form a thin coating (at a temperature preferably at about 320° F. for about 2 minutes; lower or higher temperatures, as well as correspondingly shorter or greater times may also be used). The second layer (possessing a similar viscosity to facilitate application in a large-scale procedure) is then applied in the same manner over at least a portion (preferably all) of the second layer. The second layer is then dried and cured as well (at a temperature of about 380° F. for about 2 minutes for the preferred silicone materials; again, differing temperatures and times may be followed). This discrepancy in temperatures required for drying and curing is yet another improvement over the utilization of silicone materials alone since lower temperatures are required (translating into safety improvements and lower energy costs) for the first layer at least.

The coating applications are performed through any standard coating procedures such as, and not limited to, scrape coating. This term includes, and is not limited to, knife coating, in particular knife-over-gap table, floating knife, and knife-over-foam pad methods, to name a few different method types. The resultant airbag base fabric is substantially impermeable to air when measured according to ASTM Test D737, "Air Permeability of Textile Fabrics," standards.

As previously indicated, the substrate fabric is preferably a woven nylon material. In the most preferred embodiment such substrate fabric will be formed from fibers of nylon 6,6 woven on a jacquard loom. It has been found that such polyamide materials exhibit particularly good adhesion and maintenance of resistance to hydrolysis when used in combination with the coating according to the present invention.

DETAILED DESCRIPTION OF THE INVENTION AND THE PREFERRED EMBODIMENTS

In order to further describe the present invention the following nonlimiting examples are set forth. These examples are provided for the sole purpose of illustrating some preferred embodiments of the invention and are not to be construed as limiting the scope of the invention in any manner.

EXAMPLE 1

Silicone Topcoat System

| First Layer | |
| --- | --- |
| Component | Amount |
| Ru 40-350 (40% solids) | 45 parts |
| Rhoplex ® E-358 (60% solids) | 21 parts |
| Natrosol ™ 250 HHXR | 1.6 parts |
| Water | 2 parts |
| Second Layer | |
| Dow Corning 3625 LSR silicone resin | |

The first layer (base coating) was applied using a floating knife with a dry coating weight of about 0.8 ounces per square yard on each side of a Jacquard woven side impact curtain-type nylon 6,6 airbag fabric (with pillows stitched within the fabric). This layer was immediately dried at 320° F. for about 2 minutes. The second layer (topcoat) was then applied using a knife-over-gap table method with an add-on weight of about 1.0 ounces per square yard on each side of the airbag over the first layer. This coating was then cured at about 380° F. for about 2 minutes.

The resultant coated airbag was then rapidly inflated for testing by pressurizing the bag using a 6.7 liter 100 psi nitrogen gas tank, generating about 30 psi initial peak bag pressure. The pressure drop over time was then recorded as a measure of b ag leakage. In 10 seconds, the pressure dropped from 30 to 15 psi, showing excellent air permeability.

Furthermore, after storage in an oven kept at about 107° C. for about 2 weeks (to simulate an accepted aging test for airbag fabrics), the coated airbag retained approximately the same leakage rate as the initial test after production.

EXAMPLE 2

Silicone Topcoat System

| First Layer | |
| --- | --- |
| Component | Amount |
| Rhoplex ® E-358 (60% solids) | 100 parts |
| Epi-Rez ™ 5520 (60% solids) | 15 parts |
| Natrosol ™ 250 HHXR | 1.8 parts |
| Water | 10 parts |
| Second Layer | |
| Dow Corning 3625 LSR silicone resin | |

The layers were applied and the resultant bag was tested in the same manner as described in EXAMPLE 1, above. The initial testing for leakage showed a pressure drop of from 30 psi to about 8 psi in 10 seconds. The aged bag retained approximately the same leakage rate.

EXAMPLE 3

Non-Silicone Topcoat System

| First Layer | |
| --- | --- |
| Same as for EXAMPLE 1, above | |
| Second Layer | |
| Component | Amount |
| Pyropoly AC 2000 | 30 parts |
| Amsperse ™ FR 51 | 37 parts |
| Cymel M-3 | 3 parts |
| Natrosol ™ 250 HHXR | 1 part |
| Water | 1 part |

This system was applied and the resultant airbag was tested in the same manner as described in EXAMPLE 1, above. The second layer, however, had a dry coating weight of 0.6 ounces per square yard. The initial testing for leakage showed a pressure drop of from 30 psi to about 8 psi in 10 seconds. The aged bag showed a leakage rate of from about 30 to about 6 psi in 10 seconds.

EXAMPLE 4

Comparative

Silicone Coating Alone

The same type of airbag was then treated solely with the second layer from EXAMPLE 1, above with an add-on weight of about 2 ounces per square yard on each side of the airbag. The bag was then tested for pressure drop in the same manner as above and was found to drop from 30 to 0 psi in 10 seconds. Clearly, the air permeability of EXAMPLES 1–3 were dramatically greater than this comparative test even after aging.

There are, of course, many alternative embodiments and modifications of the present invention which are intended to be included within the spirit and scope of the following claims.

What I claim is:

1. An airbag fabric comprising a coating applied to at least a portion of the surface of said airbag fabric, wherein said coating comprises at least two layers wherein the first layer is in contact with at least a portion of the airbag fabric and is at least one non-silicone coating material and the second layer is a coating for at least a portion of said first layer and is at least one material providing sufficient aging stability for the first later selected from the group consisting of at least one non-silicone compound other than the coating material of said first layer and at least one silicone compound.

2. The airbag of claim 1 wherein said non-silicone coating material of said first layer is at least compound selected from the group consisting of polyurethane, polyacrylate, butyl rubber, EPDM, chloroprene, neoprene, polyamide, hydrogenated nitrile rubber, ethylene-vinylacetate copolymers, and any mixtures or dispersions thereof.

3. The airbag of claim 2 wherein said second layer is comprised of at least one silicone compound.

4. An airbag comprising the airbag fabric of claim 3.

5. The airbag fabric of claim 2 wherein said first layer is applied to the airbag fabric in an amount of from about 0.6 to about 1.5 ounces/square yard.

6. An airbag comprising the airbag fabric of claim 5.

7. The airbag fabric of claim 2 wherein said first layer is applied to the airbag fabric in an amount of from about 0.3 to about 2.5 ounces/square yard and wherein said second layer is applied over at least a portion said first layer in an amount of from about 0.3 to about 2.5 ounces/square yard.

8. An airbag comprising the airbag fabric of claim 7.

9. The airbag fabric of claim 2 wherein said first layer is formed from a dispersion of polyacrylate and polyurethane.

10. An airbag comprising the airbag fabric of claim 9.

11. The airbag fabric of claim 12 wherein said second layer is a silicone resin.

12. An airbag comprising the airbag fabric of claim 11.

13. An airbag comprising the airbag fabric of claim 2.

14. The airbag of claim 1 wherein said first layer is a water borne dispersion.

15. An airbag comprising the airbag fabric of claim 14.

16. The airbag fabric of claim 1 wherein said first layer is applied to the airbag fabric in an amount of from about 0.3 to about 2.5 ounces/square yard.

17. An airbag comprising the airbag fabric of claim 16.

18. The airbag fabric of claim 1 wherein said first layer coating material exhibits a tensile strength of greater than 600 psi and an elongation at break of between 100 and 600% of its original length.

19. An airbag comprising the airbag fabric of claim 1.

* * * * *

UNITED STATES PATENT AND TRADEMARK OFFICE
CERTIFICATE OF CORRECTION

PATENT NO. : 6,177,365 B1 Page 1 of 1
APPLICATION NO. : 09/335257
DATED : January 23, 2001
INVENTOR(S) : Shulong Li It is certified that error appears in the above-identified patent and that said Letters Patent is hereby corrected as shown below:

In Column 8, Line 12, Claim 11, please delete "12" and insert -- 9 -- after the word "claim".

Signed and Sealed this

Tenth Day of July, 2007

JON W. DUDAS
*Director of the United States Patent and Trademark Office*